United States Patent
Weidner et al.

(10) Patent No.: US 11,326,370 B2
(45) Date of Patent: May 10, 2022

(54) APPARATUSES, SYSTEMS, AND METHODS FOR LATCHING OBJECTS

(71) Applicant: Lockheed Martin Corporation, Bethesda, MD (US)

(72) Inventors: Brittany Michelle Weidner, Marietta, GA (US); Pat G. Vitztum, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 399 days.

(21) Appl. No.: 16/427,110

(22) Filed: May 30, 2019

(65) Prior Publication Data

US 2020/0378156 A1    Dec. 3, 2020

(51) Int. Cl.
  *E05B 63/00*   (2006.01)
  *E05C 3/02*    (2006.01)
  *E05B 41/00*   (2006.01)

(52) U.S. Cl.
  CPC ............ *E05B 63/006* (2013.01); *E05C 3/02* (2013.01); *E05B 41/00* (2013.01); *E05Y 2900/502* (2013.01)

(58) Field of Classification Search
  CPC .. E05B 63/006; E05B 41/00; E05B 2047/002; E05B 81/34; E05C 3/02; E05Y 2900/502
  USPC ... 292/194, 195, 199, 201, 256, 256.69, 280
  See application file for complete search history.

(56) References Cited

U.S. PATENT DOCUMENTS

| | | | |
|---|---|---|---|
| 2,487,022 A | 11/1949 | La Placa | |
| 2,828,589 A * | 4/1958 | Hercik | B23Q 1/5462 451/411 |
| 3,429,476 A * | 2/1969 | Ellis | F16L 55/136 220/325 |
| 4,429,862 A | 2/1984 | Niedecker | |
| 4,500,081 A * | 2/1985 | Carossino | B25B 5/108 269/100 |
| 5,080,336 A * | 1/1992 | Carossino | B25B 5/163 269/226 |
| 5,516,087 A | 5/1996 | Schmid et al. | |
| 6,428,060 B1 | 8/2002 | Metz | |
| 6,845,975 B2 | 1/2005 | Tünkers | |
| 6,969,056 B2 | 11/2005 | Sato et al. | |
| 7,144,005 B2 | 12/2006 | Sato et al. | |
| 8,356,844 B2 | 1/2013 | Baic et al. | |
| 8,419,088 B2 | 4/2013 | Baic et al. | |
| 8,544,900 B2 | 10/2013 | Elbrecht et al. | |
| 9,550,262 B2 | 1/2017 | Fukano et al. | |
| 9,650,807 B2 | 5/2017 | Helsley | |
| 9,663,216 B2 | 5/2017 | Hernandez | |
| 10,220,491 B2 | 3/2019 | Fukui et al. | |
| 2005/0200137 A1* | 9/2005 | Nelsen | E05B 81/06 292/201 |
| 2011/0252844 A1* | 10/2011 | Shoemaker | E05B 65/0021 70/100 |

(Continued)

*Primary Examiner* — Christine M Mills
*Assistant Examiner* — Yahya Sidky
(74) *Attorney, Agent, or Firm* — Baker Botts L.L.P.

(57) ABSTRACT

In one embodiment, a system includes a first object, a second object, and a latch. The latch includes a worm gear, a spur gear, and a lever arm. The spur gear rotates in response to rotating the worm gear. The lever arm rotates in response to rotating the spur gear. The first object latches to the second object in response to rotating the lever arm.

18 Claims, 7 Drawing Sheets

(56) References Cited

U.S. PATENT DOCUMENTS

2013/0112843 A1\* 5/2013 Young .................. F16C 11/106
248/636

\* cited by examiner

APPARATUSES, SYSTEMS, AND METHODS FOR LATCHING OBJECTS

TECHNICAL FIELD

This disclosure generally relates to latching objects, and more specifically apparatuses, systems, and methods for latching objects.

BACKGROUND

Aircraft may contain access panels that can be removed to provide access to the compartment beyond. Latches may be used to secure the access panels to adjacent panels. However, the latches can fail during installation due to over-torqueing. Further, the latches may need to be refitted to accommodate different panel thickness, which can be time consuming.

SUMMARY

According to an embodiment, a system includes a first object, a second object, and a latch. The latch includes a worm gear, a spur gear, and a lever arm. The spur gear rotates in response to rotating the worm gear. The lever arm rotates in response to rotating the spur gear. The first object latches to the second object in response to rotating the lever arm.

According to another embodiment, an apparatus includes a worm gear, a spur gear, and a lever arm. The spur gear rotates in response to rotating the worm gear and the lever arm rotates in response to rotating the spur gear. A first object latches to a second object in response to rotating the lever arm.

According to yet to another embodiment, a method includes rotating a worm gear of a latch. The method also includes rotating a spur gear of the latch in response to rotating the worm gear and rotating a lever arm of the latch in response to rotating the spur gear. The method further includes latching a first object to a second object in response to rotating the lever arm.

Technical advantages of this disclosure may include one or more of the following. The latch described herein is an improvement over current latch designs due to the new latch's ability to indicate to a user that the latch is either engaged or unengaged. This indication may allow the user of the latch, such as an airline operator, to mitigate an unengaged latch, which may prevent failure such as aircraft panels coming loose and/or departing while the aircraft is in flight. The disclosed latch may improve reliability of the assembly by reducing and/or preventing over-torqueing, which may lead to the latch's failure. Furthermore, the ability for the latch to self-align for multiple panel heights may decrease installation time when compared to the current latch designs. In certain embodiments, the footprint of the latch may match previous latch designs to minimize the impact of the latch into production such that immediate interchangeability and replacement may be implemented.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

In certain embodiments disclosed herein, a latch includes a visual flag that indicates whether the latch is engaged with an object such as a panel. When the latch is not engaged, a force drives a worm gear of the latch further into the latch's housing, which allows a spring to expand. As a result, the worm gear becomes recessed from the object upon which the latch is situated. This recession provides the visual flag to the user that the latch is not engaged. When the latch is engaged, the end of the worm gear is flush with the mounting object, which provides a visual indication to the user that the latch is engaged. In some embodiments disclosed herein, a spherical contact pad at an end of a lever arm of the latch allows the latch to self-align for varying panel heights without adjustment from the user. The worm gear may also provide an automatic adjustment for panel clamp-up thickness.

Figure 1:
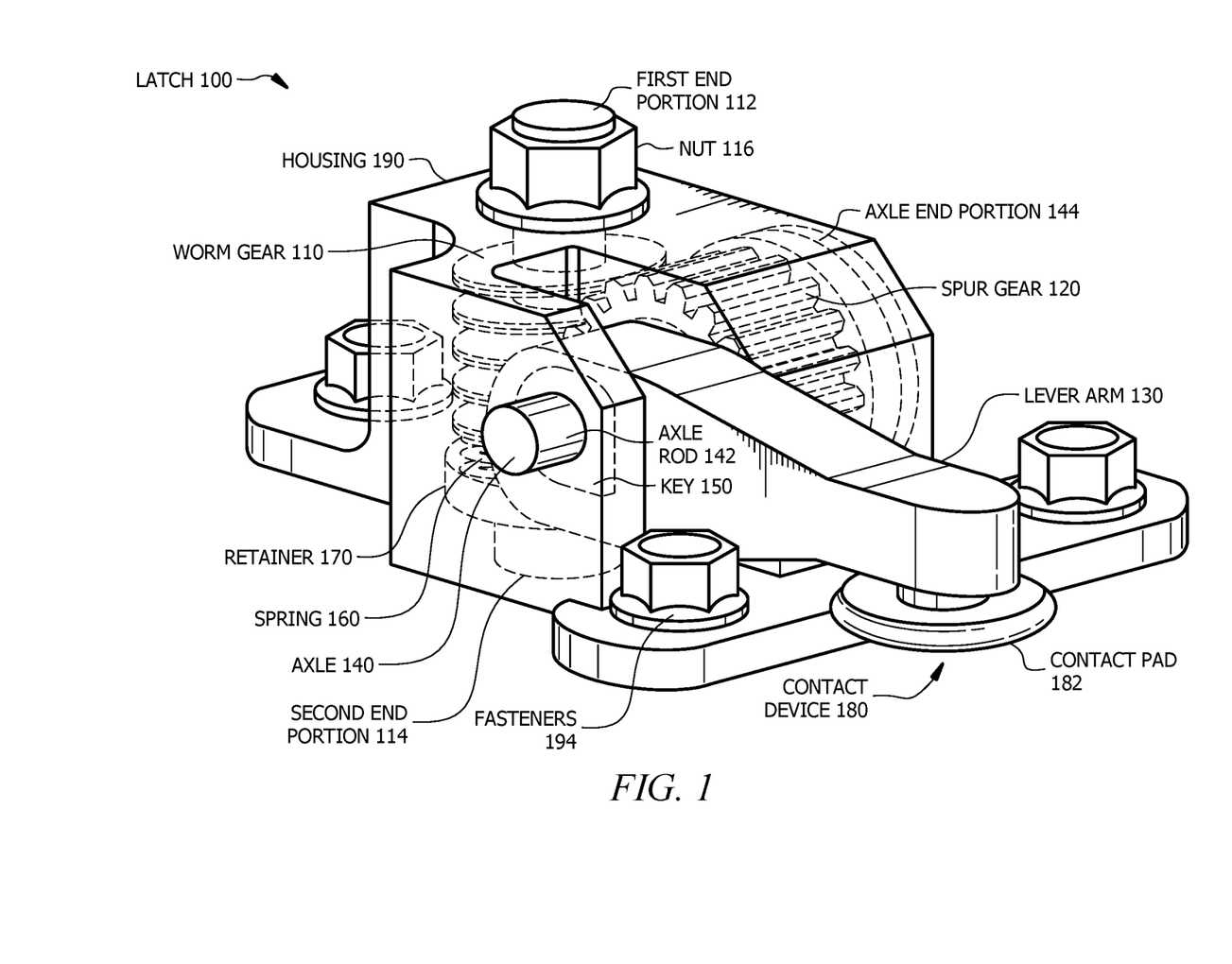
FIG. 1 illustrates an example latch.
Figure 2:
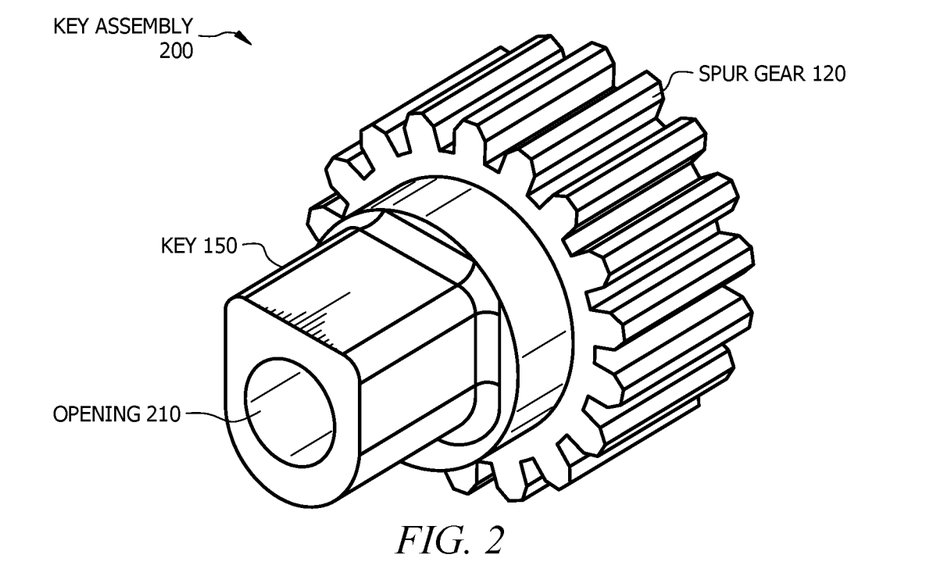
FIG. 2 illustrates an example key assembly that may be used by the latch of FIG. 1.
Figure 3:
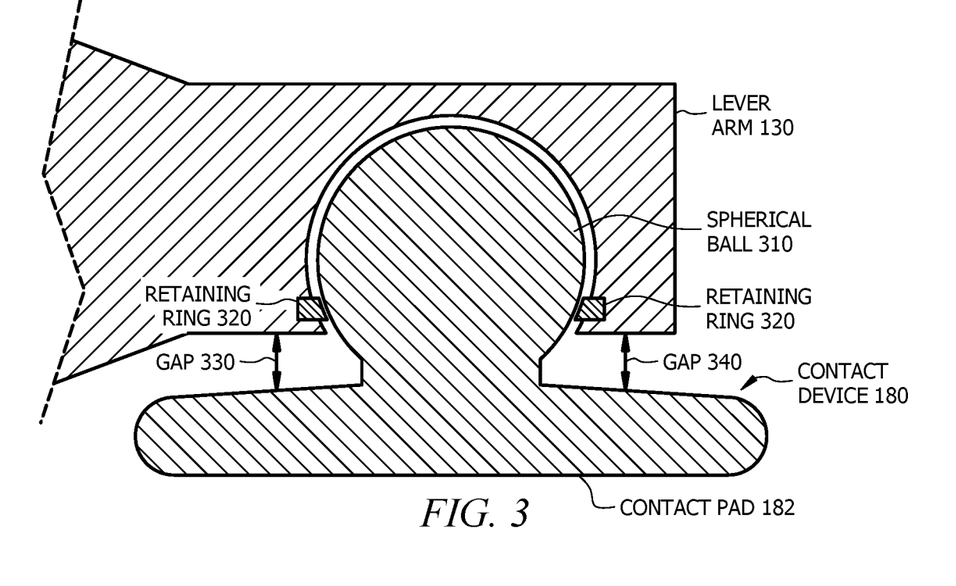
FIG. 3 illustrates an example contact device that may be used by the latch of FIG. 1.
Figure 4A:
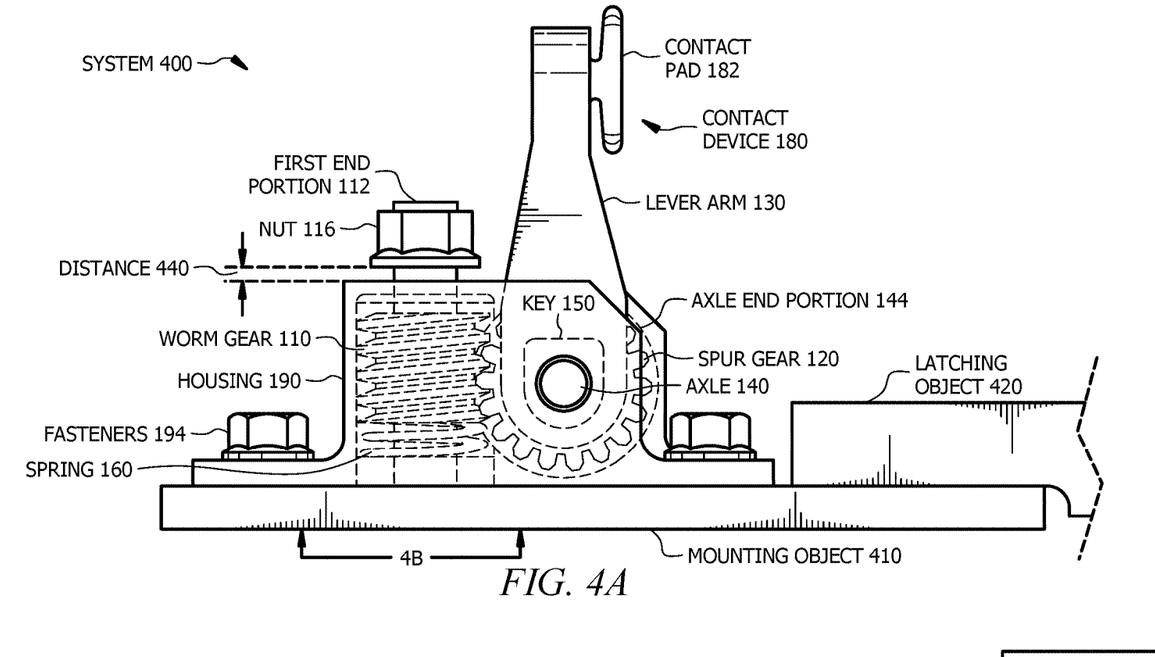
FIG. 4A illustrates an example system for latching two objects.
Figure 4B:
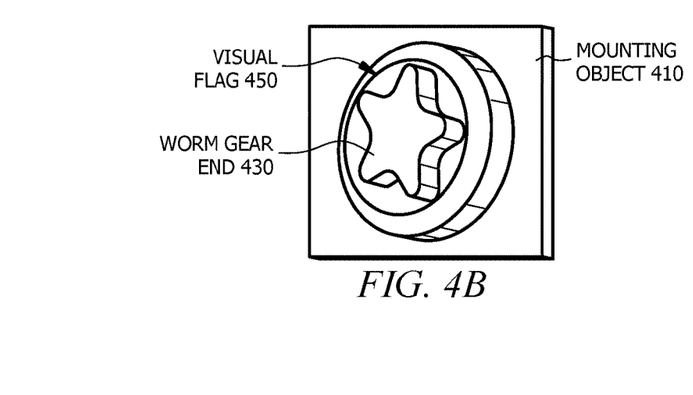
FIG. 4B illustrates an example visual flag that may be used by the system of FIG. 4A.
Figure 5:
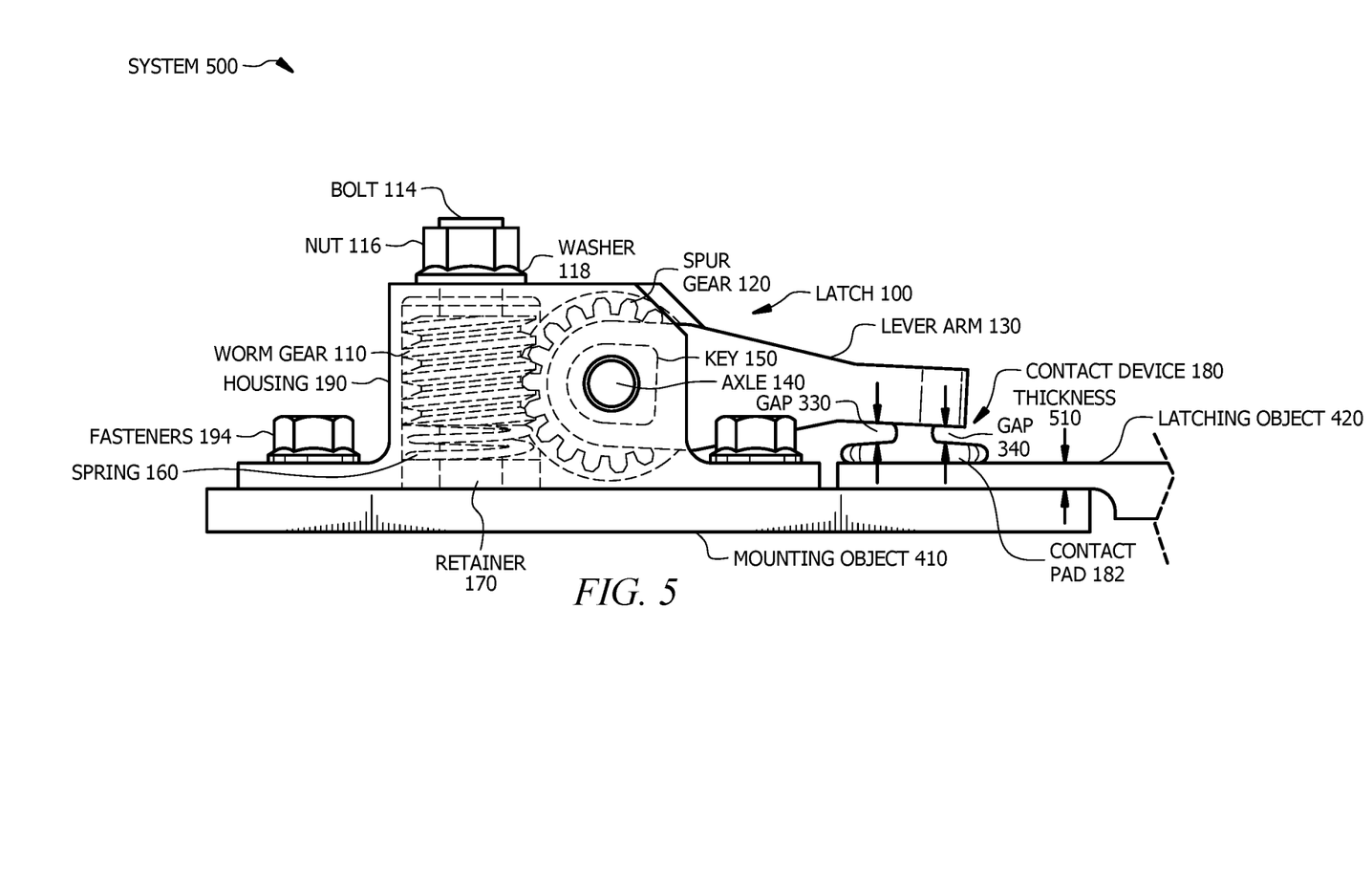
FIG. 5 illustrates another example system for latching two objects.
Figure 6:
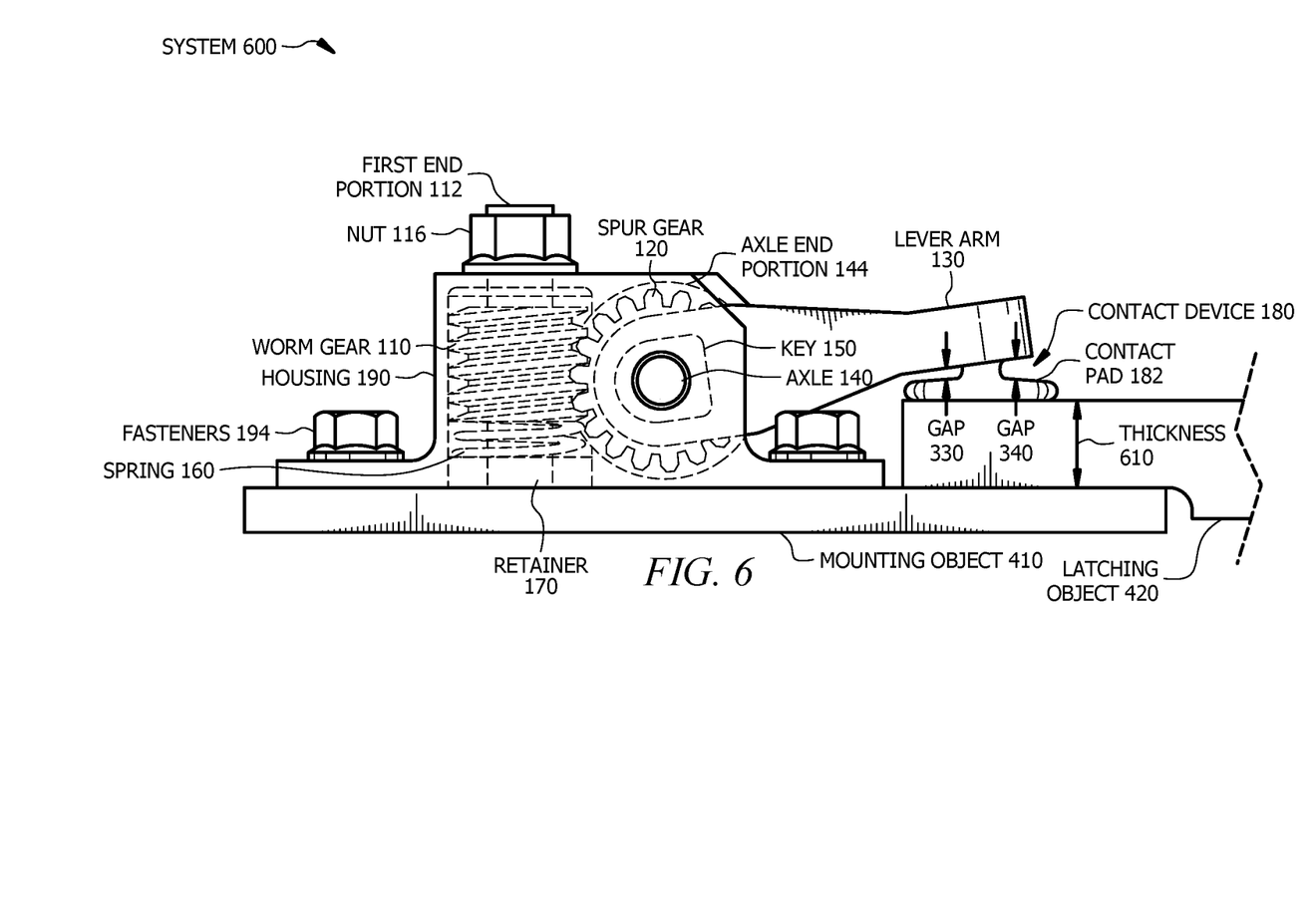
FIG. 6 illustrates yet another example system for latching two objects.
Figure 7:
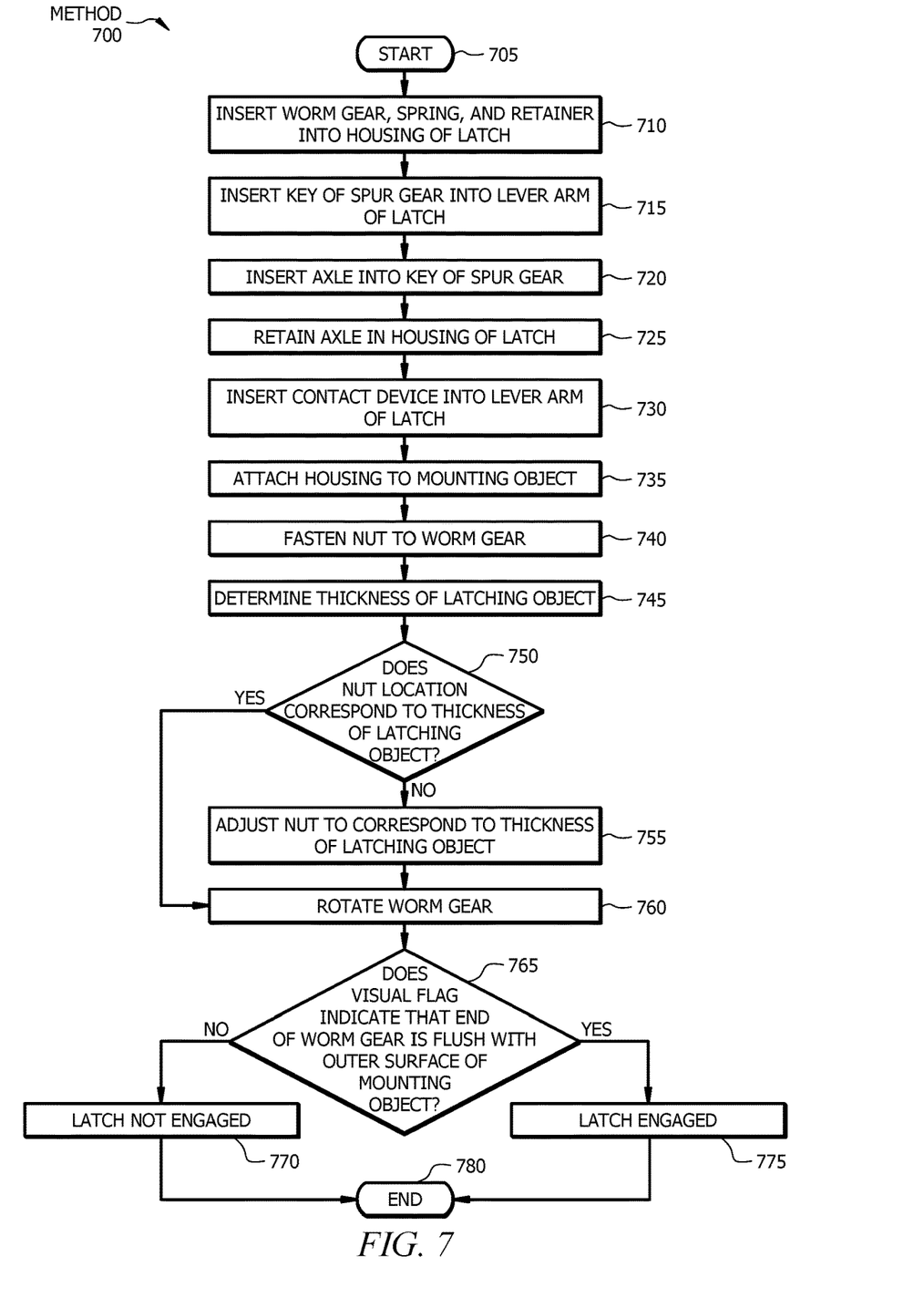
FIG. 7 illustrates an example method for latching two objects.
Figure 8:
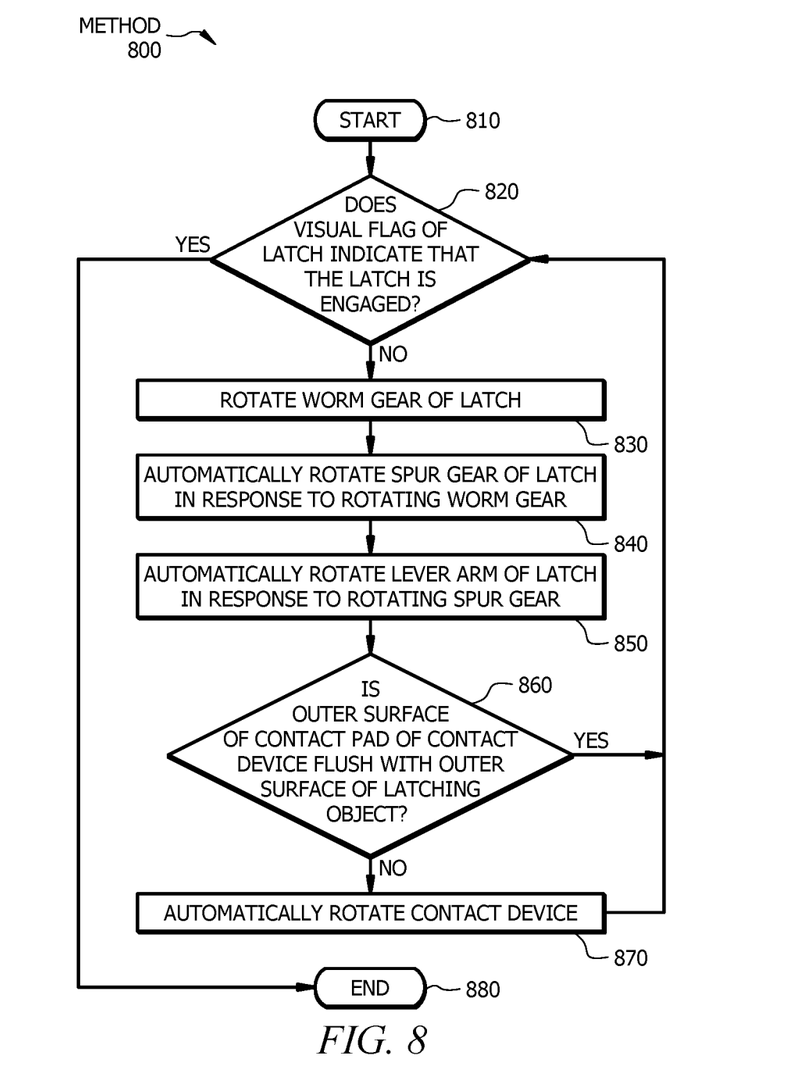
FIG. 8 illustrates another example method for latching two objects.

FIGS. 1 through 7 show example apparatuses, systems, and methods for latching objects. FIG. 1 shows an example latch. FIG. 2 shows an example key assembly that may be used by the latch of FIG. 1 and FIG. 3 show an example contact device that may be used by the latch of FIG. 1. FIGS. 4, 5, and 6 show example systems for latching two objects, and FIGS. 7 and 8 show example methods for latching two objects.

FIG. 1 illustrates an example latch 100. Latch 100 of FIG. 1 includes a worm gear 110, a nut 116, a spur gear 120, a lever arm 130, an axle 140, a key 150, a spring 160, a retainer 170, a contact device 180, and a housing 190. Latch 100 or portions thereof may be associated with an entity, which may include any entity, such as a business or company that uses a latch to engage an object with another object. For example, an aircraft carrier may use latch 100 to engage a quick access panel on an aircraft with an adjacent panel on the aircraft. In certain embodiments, one or more components of latch 100 may be manually adjusted by a user (e.g., an operator) and/or a tool (e.g., a torque wrench). In some embodiments, one or more components of latch 100 may be automatically adjusted using any suitable combination of hardware, firmware, and software. For example, one or more components of latch 100 may be implemented using one or more components of a computer system (e.g., a processor, a controller, and/or an interface). One or more components of FIG. 1 may be made of any suitable material (e.g., aluminum, copper, steel, titanium, nickel, steel, plastic, rubber, fabric, etc.)

Worm gear 110 of latch 100 represents any mechanical device with a threaded shaft that mates with spur gear 120.

Worm gear 110 may rotate about a fixed axis. Worm gear 110 includes a first end portion 112 and a second end portion 114. First end portion 112 of worm gear 110 is adjacent to a first end of the threaded rod of worm gear 110 and extends outside of housing 190. Nut 116 of latch 100 is fastened to first end portion 112 of worm gear 110 outside of housing 190. Second end portion 114 of worm gear 112 is adjacent to a second end of the threaded rod of worm gear 110 and extends outside of housing 190 toward a mounting object such as a panel, as shown in FIGS. 4A and 4B. Second end portion 114 of worm gear 112 passes through spring 160 and retainer 170 of latch 100.

Spur gear 120 of latch 100 represents any mechanical device with involuted teeth that engage with the threaded shaft of spur gear 120. The teeth of spur gear 120 may project parallel to an axis of the spur gear. As worm gear 110 is rotated, the threaded shaft of worm gear 110 engages with the teeth of spur gear 120 to rotate spur gear 120.

Gear ratios between worm gear 110 and spur gear 120 depend on the size and shape of worm gear 110 and spur gear 120. For example, worm gear 110 and spur gear 120 for a small latch 100 may be sized such that the gear ratio is 20:1 (i.e., for every 20 full rotations of worm gear 110, spur gear rotates one full rotation). As another example, worm gear 110 and spur gear 120 may be sized for a relatively larger latch 100 such that the gear ratio is 30:1 (i.e., for every 30 full rotations of worm gear 110, spur gear rotates one full rotation).

The gear ratio for latch 100 may be determined to ensure that spur gear 120 cannot drive worm gear 110 backwards (i.e., in a direction that would cause the latch to move away from the latching object). Anti-back drive plus torque ensures that the two latched objects remain latched. In certain embodiments, the gear ratio for latch 100 is determined based on the required load capacity. Larger latches 100 provide greater latching load capacity than smaller latches 100.

In the illustrated embodiment of FIG. 1, spur gear 120 attaches to key 150. Key 150 of latch 100 is any physical component that joins lever arm 130 to spur gear 120. When spur gear 120 rotates, key 150 causes lever arm 130 to pivot such that spur gear 120 and lever arm 130 move together. Key 150 may be physically attached (e.g., welded) to spur gear 120. In certain embodiments, key 150 is inserted into lever arm 130. Lever arm 130 of latch 100 is any physical component that is operable to pivot about a fixed axis. In the illustrated embodiment of FIG. 1, lever arm 130 pivots about a center axis of axle 140. Axle 140 is a physical component that joins key 150 and spur gear 120. Axle 140 may include a rod 142 that passes through key 150 and spur gear 120. Axle 140 may include an axle end portion 144 that is located adjacent to spur gear 120 such that spur gear is located between lever arm 130 and axle end portion 144.

Spring 160 of latch 100 is any mechanical, elastic object that can compress and extend. Spring 160 may be a wave spring, a coil spring, or any other suitable type of spring that can compress and extend. Spring 160 of latch 100 is located adjacent to the threaded shaft of worm gear 110. Retainer 170 of latch 100 is a physical component located adjacent to spring 160. Retainer 170 retains spring 160 from axial movement beyond retainer 170 in a direction toward an end of second end portion 114 of worm gear 110.

Contact device 180 of latch 100 attaches to lever arm 130. Contact device 180 includes a contact pad 182 that exerts pressure on a latching object as lever arm 130 rotates toward the latching object. Contact device 180 can rotate within lever arm 130 to accommodate different latching object (e.g., panel) thicknesses, as shown in FIGS. 5 and 6 below. Contact device 180 is described in more detail in FIG. 3 below.

Housing 190 of latch 100 is any component that surrounds one or more portions of latch 100. For example, housing 190 of latch 100 may surround one or more portions of worm gear 110 and/or spur gear 120. Housing 190 may hold one or more components of latch 100 together. Housing 190 may protect one or more components of latch 100 from outside elements such as dust, debris, water, and the like. Housing 190 may fit tight against one or more components of latch 100 to minimize the gap between an inner surface of housing 190 and an outer surface of one or more components of latch 100. Housing 190 is fastened to a mounting object (e.g., panel 410 of FIG. 4A) with one or more fasteners 194. Fastener 194 is any device (e.g., a bolt, a screw, etc.) that secures latch 100 to the mounting object. In certain embodiments, latch 100 may be mounted to mounting object without the use of fasteners 194. For example, housing 190 may be welded or glued to the mounting object.

One or more components of latch 100 may be installed after the installation of housing 190. For example, spur gear 120 may be installed through an opening of housing 190. Axle 140 may then be installed after spur gear 120 through the same opening such that axle end portion 144 of axle 140 holds spur gear 120 in place. A retaining ring (e.g., retaining ring 320 of FIG. 3) secured to housing 190 may be used to retain axle 140 in place. The retaining ring may prevent axial movement of axle 140 and spur gear 120 relative to housing 190. The retaining ring secured to housing 190 may be installed after the installation of axle 140.

Although FIG. 1 illustrates a particular number of latches 100, worm gears 110, nuts 116, spur gears 120, lever arms 130, axles 140, keys 150, springs 160, retainers 170, contact devices 180, contact pads 182, housings 190, and fasteners 194, this disclosure contemplates any suitable number of latches 100, worm gears 110, nuts 116, spur gears 120, lever arms 130, axles 140, keys 150, springs 160, retainers 170, contact devices 180, contact pads 182, housing 190, and fasteners 194. For example, latch 100 may include more or less than three fasteners 194.

Although FIG. 1 illustrates a particular arrangement of latch 100, worm gear 110, nut 116, spur gear 120, lever arm 130, axle 140, key 150, spring 160, retainer 170, contact device 180, contact pad 182, housing 190, and fasteners 194, this disclosure contemplates any suitable arrangement of latch 100, worm gear 110, nut 116, spur gear 120, lever arm 130, axle 140, key 150, spring 160, retainer 170, contact device 180, contact pad 182, housing 190, and fasteners 194. For example, the arrangement of worm gear 110, spur gear 12, and lever arm 130 may be mirrored.

In operation, housing 190 of latch 100 is attached to a mounting object with fasteners 194 to secure latch 100 to the mounting object. A user (e.g., an operator) uses a torque wrench to rotate worm gear 110 of latch 100. The threaded shaft of worm gear 110 mates with the teeth of spur gear 120, which causes a rotation of spur gear 120. Key 150 attached to spur gear 120 is locked into lever arm 130 such that spur gear 120 and lever arm 130 rotate simultaneously. As spur gear 120 rotates, lever arm 130 rotates. Lever arm 130 pivots about axle 140 until contact pad 182 of contact device 180 contacts a surface of a latching object. Contact device 180 rotates within lever arm 130 to accommodate different latching object thicknesses. The latching object overlaps the mounting object. The pressure exerted by contact device 180 on the latching object (e.g., a quick access panel) latches the latching object to the mounting object. When the latching object is latched, an end of second end portion 114 of worm gear 110 is flush with an outer surface of the mounting object, which provides a visual flag to the operator that latch 100 is engaged.

As such, latch 100 of FIG. 1 provides a visual flag to an operator that indicates whether latch 100 is engaged or unengaged, which may prevent over-torqueing of latch 100 and/or prevent the latched object from coming loose.

FIG. 2 illustrates an example key assembly 200 that may be used by latch 100 of FIG. 1. Key assembly 200 includes spur gear 120 and key 150. Key 150 is physically connected to spur gear 120 such that movement of key 150 relative to spur gear 120 is restricted. In certain embodiments, key assembly 200 is welded to spur gear 120. In some embodiments, key 150 and spur gear 120 are manufactured as one piece. Rotation of spur gear 120 causes rotation of key 150.

Key 150 is inserted into lever arm 130, as illustrated in FIG. 1. Rotation of key 150 causes rotation of lever arm 130. Key 150 may be any suitable size and shape to cause rotation of lever arm 130. In the illustrated embodiment of FIG. 2, an outside surface of a cross section of key 150 has a combined square and semi-circle shape with rounded corners. The shape of key 150 is complementary to an opening in lever arm 130 into which key 150 is inserted. Key 130 includes an opening 210 for placement of axle 140 of FIG. 1. Axle 140 may be inserted into opening 210. Key 150 may rotate about a centerline axis of axle 140. Key 150 may rotate while axle 140 remains stationary. Opening 210 may be any suitable size and shape to allow key 150 to rotate while axle 140 remains stationary. In the illustrated embodiment of FIGS. 1 and 2, opening 210 and axle 140 are circular in cross section to accommodate the movement of key 150 about axle 140.

FIG. 3 illustrates an example contact device 180 that may be used by latch 100 of FIG. 1. Contact device 180 includes contact pad 182 and spherical ball 310. Contact pad 182 contacts a surface of a latching object (e.g., an access panel) that may be latched to the mounting object. Contact pad 182 is physically connected to spherical ball 310. In certain embodiments, contact pad 182 and spherical ball 310 are manufactured as one piece. Spherical ball 310 is any object that can rotate within lever arm 130. In the illustrated embodiment of FIG. 3, spherical object 310 has the shape of a sphere such that it can rotate within a spherical opening in lever arm 130. Contact pad 182 and spherical ball 310 may be any suitable size and shape to accommodate the required load capacity. For example, contact pad 182 may be ½ inch in diameter and spherical ball 310 may be ¼ inch in diameter.

A retaining ring 320 may be used to hold spherical ball 310 of contact device 180 in the opening of lever arm 130. Retaining ring 320 is a fastener that acts as a shoulder to retain spherical ball 310. Spherical object 310 may be inserted into the opening in lever arm 130, and retaining ring 320 may then be inserted into the opening in lever arm 30 to retain spherical ball 310. As illustrated in FIG. 3, retaining ring 320 may be installed in a circular groove of lever arm 130. Retaining ring 320 may be a tapered section retaining ring, a constant section retaining ring, a spiral retaining ring, a circular push-on retaining ring, or any other suitable object that can prevent contact device 180 from disengaging from lever arm 130.

Contact device 180 is installed within the opening of lever arm 130 to provide for a gap 330 and a gap 340 between an outer surface of contact pad 182 of contact device 180 and an outer surface of lever arm 140. Gap 330 and gap 340 allow contact device 180 to rotate within lever arm 130 to accommodate different latching object thicknesses, as illustrated in FIGS. 5 and 6 below. As contact device 180 rotates clockwise relative to the view illustrated in FIG. 3, gap 330 decreases until gap 330 is restricted from movement by lever arm 130 and gap 340 increases to its maximum size. Likewise, as contact device 180 rotates counterclockwise relative to the view illustrated in FIG. 3, gap 340 decreases until gap 340 is restricted from movement by lever arm 130 and gap 330 increases to its maximum size.

FIG. 4A illustrates an example system 400 for latching two objects, and FIG. 4B illustrates a visual flag 450 that may be used by system 400 of FIG. 4A. System 400 includes latch 100, worm gear 110, nut 116, spur gear 120, lever arm 130, axle 140, key 150, spring 160, retainer 170, contact device 180, housing 190, a mounting object 410, and a latching object 420. Mounting object 410 is any object upon which latch 100 is mounted. In the illustrated embodiment of FIG. 4, mounting object 410 is a panel, and latch 100 is mounted to mounting object 410 using multiple fasteners 194. Latching object 420 is any object that can be latched to mounting object 410. Latching object 420 may include a flap that overlaps mounting object 410. In certain embodiments, the flap of latching object 420 is thinner than a main portion of latching object 420. The thickness of the flap of latching object 420 may range from 0.10 inches to 0.50 inches. In the illustrated embodiment of FIG. 4, latching object 420 is a panel (e.g., a quick access panel) having a flap that overlaps a portion of mounting object 410.

Latch 100 of the illustrated embodiment of FIG. 4A is in an unengaged position such that latching object 420 is not latched to mounting object 410. As shown, lever arm 130 of latch 100 is positioned perpendicular to mounting object 410. Contact device 180 of latch 100 is not in contact with latching object 420. When latch 100 is in an unengaged position, spring 160 of latch 100 is expanded, which causes an end of the threaded shaft of worm gear 110 to contact an inner surface of housing 190 as illustrated in FIG. 4A. When latch 100 moves from an engaged position to an unengaged position, spring 160 of latch 100 expands, which causes worm gear 110 to move away from mounting object 410 and toward the inner surface of housing 190. The expansion of spring 160 causes worm gear end 430 of worm gear 110 to recess from a bottom surface of mounting object 410, which creates visual flag 450 of FIG. 4B that indicates that latch 100 is unengaged. Visual flag 450 may improve the reliability of latch 100 over other latch designs by providing an indication to an operator that latch 100 is unengaged.

Distance 440 between base of nut 116 and an outer surface of housing 190 is provided to accommodate different thicknesses of mounting object 410. As the thickness of mounting object 410 increases, travel of worm gear 110 increases, which increases distance 440 required between nut 116 and housing 190. Distance 440 may be manually adjusted by a user (e.g., an operator) once the thickness of mounting object 410 is determined.

FIGS. 5 and 6 illustrate example systems 500 and 600 for latching two objects. Systems 500 and 600 include latch 100, worm gear 110, nut 116, spur gear 120, lever arm 130, axle 140, key 150, wave spring 160, retainer 170, contact device 180, housing 190, mounting object 410, and latching object 420. In the illustrated embodiments of FIGS. 5 and 6, mounting object 410 and latching object 420 are panels, and latch 100 is mounted to mounting object 410 using multiple fasteners 194.

Latch 100 of the illustrated embodiments of FIGS. 5 and 6 is in an engaged position such that latching object 420 is latched to mounting object 410. As shown, contact device 180 is in contact with latching object 420 when latch 100 is engaged. When latch 100 is in an engaged position, spring 160 of latch 100 is compressed and an outer surface of nut 116 contacts an outer surface of housing 190, as illustrated in FIGS. 5 and 6. When latch 100 moves from an unengaged position to an engaged position, the threaded shaft of worm gear 100 moves toward mounting object 410, which causes spring 160 of latch 100 to compresses against retainer 170. The movement of the threaded shaft of worm gear 110 toward mounting object 410 causes worm gear end 430 of worm gear 110 to move toward a bottom surface of mounting object 410 until worm gear end 430 is flush with the bottom surface of mounting object 410. Worm gear end 430 is prevented from moving past the bottom surface of mounting object 410 by the contact between nut 116 and the outer surface of housing 190. When worm gear end 430 is flush with the bottom surface of mounting object 410, a visual flag (e.g., visual flag 450 of FIG. 4B) is created that indicates that latch 100 is engaged. The visual flag may improve the reliability of latch 100 over other latch designs by providing an indication to an operator that latch 100 is engaged.

Latch 100 accommodates various thicknesses of latching objects 420, as illustrated in FIGS. 5 and 6. Thickness 510 of latching object 420 of FIG. 5 is less than thickness 610 of latching object 420 of FIG. 6. For example, thickness 510 of FIG. 5 may be 0.1 inches, whereas thickness 610 of FIG. 6 may be 0.34 inches. In the illustrated embodiment of FIG. 5, gaps 330 and 340 between contact pad 182 of contact device 180 and an outer surface of lever arm 130 are closer to the same size as compared to gaps 330 and 340 in the illustrated embodiment of FIG. 6. The change in gap size is caused by the rotation of contact device 180 relative to lever arm 130. As illustrated in FIGS. 5 and 6, a thicker panel results in less rotational movement of lever arm 130, which causes the difference between gaps 330 and 340 to be greater as compared to the thinner panel. The ability of latch 100 to self-align for varying object thicknesses may improve installation time as compared to other latch designs.

Although FIGS. 4, 5, and 6 illustrate a particular number of latches 100, worm gears 110, nuts 116, spur gears 120, lever arms 130, axles 140, keys 150, springs 160, retainers 170, contact devices 180, contact pads 182, housings 190, fasteners 194, mounting objects 410, and latching objects 420, this disclosure contemplates any suitable number of latches 100, worm gears 110, nuts 116, spur gears 120, lever arms 130, axles 140, keys 150, springs 160, retainers 170, contact devices 180, contact pads 182, housings 190, fasteners 194, mounting objects 410, and latching objects 420. For example, system 400 may include more than two mounting objects 410.

Although FIGS. 4, 5, and 6 illustrate a particular arrangement of latch 100, worm gear 110, nut 116, spur gear 120, lever arm 130, axle 140, key 150, spring 160, retainer 170, contact device 180, contact pad 182, housing 190, fasteners 194, mounting object 410, and latching object 420, this disclosure contemplates any suitable arrangement of latch 100, worm gear 110, nut 116, spur gear 120, lever arm 130, axle 140, key 150, spring 160, retainer 170, contact device 180, contact pad 182, housing 190, fasteners 194, mounting object 410, and latching object 420. For example, latch 100 of system 400 may be mounted on two mounting objects 410. As another example, contact device 180 of FIG. 4A may contact two latching objects 420.

FIG. 7 illustrates an example method 700 for latching two objects. Method 700 begins at step 705. At step 710, a worm gear, a spring, and a retainer (e.g., worm gear 110, spring 160, and retainer 170 of FIG. 1) are inserted into a housing of a latch (e.g., housing 190 of latch 100 of FIG. 1). For example, the worm gear may be inserted through a first opening located on a first side of the housing and extend through a second opening on a second side of the housing opposite the first side. The spring (e.g., a wave spring) may then be inserted into the first opening. The spring may contact a threaded shaft of the worm gear such that the spring is prevented from moving beyond the threaded shaft of the worm gear. The retainer may then be inserted through the first opening to retain the spring. The retainer may be held in place by a retaining ring that is inserted through the first opening of the housing after inserting the retainer. Method 700 then moves form step 710 to step 715.

At step 715, a key (e.g., key 150 of FIG. 1) of a spur gear (e.g., spur gear 120 of FIG. 1) may be inserted into an opening of a lever arm (e.g., lever arm 130 of FIG. 1) of the latch. The size and shape of the key may correspond to the size and shape of the lever arm opening such that the lever arm and the key move together. The key is sized and shaped to restrict movement of the key relative to the lever arm. The worm gear and spur gear are sized and shaped to ensure that spur gear cannot drive the worm gear backwards (i.e., in a direction that would cause the latch to move away from the latching object). Method 700 then moves from step 715 to step 720.

At step 720, an axle (e.g., axle 140 of FIG. 1) of the latch is inserted through an opening in the spur gear and the key. The axle is sized and shaped to allow the spur gear, the key, and the lever arm to rotate about the axle. The axle remains stationary while the key, lever arm, and spur gear rotate. In certain embodiments, the axle and the opening in the key and spur gear are circular in shape to allow rotation of the key and spur gear about the axle. Method 700 then moves from step 720 to step 725. At step 725, the axle is retained in the housing of the latch. For example, a retaining ring may be inserted into the housing after the axle is inserted into the spur gear to hold the axle and the spur gear in place. Method 700 then moves from step 725 to step 730.

At step 730, a contact device (e.g., contact device 180 of FIG. 1) is inserted into the lever arm of the latch. For example, a spherical ball (e.g., spherical ball 310 of FIG. 3) of the contact device is inserted into an opening of the lever arm. A retaining ring (e.g., retaining ring 320 of FIG. 3) may be installed after the spherical ball is inserted into the lever arm to prevent the spherical ball of the contact device from departing from the opening in the lever arm. Method 700 them moves from step 730 to step 735.

At step 735, a housing (e.g., housing 190 of FIG. 1) surrounding one or more portions of the latch is attached to a mounting object (e.g., mounting object 410 of FIG. 4A). The housing may be attached to the mounting object (e.g., a panel) with one or more fasteners (e.g., fasteners 194 of FIG. 1). The housing is attached to the mounting object to prevent the latch from moving relative to the mounting object. Method 700 then moves from step 735 to step 740.

At step 740, a nut (e.g., nut 116) is fastened to an end portion (e.g., first end portion 112 of FIG. 1) of the worm gear. The nut may be fastened to the end of the worm gear that extends through the second opening on the second side of the housing. The nut may be threaded such that the nut is screwed onto the end of the worm gear. Method 700 then moves from step 740 to step 745. At step 745, a thickness of a latching object (e.g., latching object 420 of FIG. 4A) is determined. The latching object may be an easy access panel that overlaps the mounting object. The thickness of the latching object may range from 0.1 inches to 0.34 inches in thickness.

Method 700 then moves from step 745 to step 750, where method 700 determines whether the nut location on the end portion of the worm gear corresponds to the thickness of the latching object. The nut restricts axial movement of the worm gear as the worm gear moves toward the mounting object. Since thicker panels require less rotational movement of the lever arm, less distance between the nut and the housing is required relative to thinner panels. If the nut location corresponds to the thickness of the latching object, method 700 advances from step 750 to step 760. If the nut location does not correspond to the thickness of the latching object, method 700 moves from step 750 to step 755, where the nut location is adjusted to correspond to the thickness of the latching object. For example, the nut location may need to be adjusted such that more space is provided between the nut and the housing for thinner panels. Method 700 then moves to step 760.

At step 760, the worm gear is rotated. For example, a user (e.g., an operator) may rotate the worm gear with a torque wrench by accessing an end of the worm gear through the first opening on the first side of the housing. Rotating the worm gear causes rotation of the spur gear, which causes the lever arm to pivot toward the latching object. Method 700 then moves from step 760 to step 765.

At step 765, a determination is made as to whether a visual flag (e.g., visual flag 450 of FIG. 4B) indicates whether the end of the worm gear is flush with an outer surface of the mounting object. A user (e.g., an operator) may make this determination. If the visual flag does not indicate that the end of the worm gear is flush with the outer surface of the mounting object (e.g., the end of the worm gear is recessed from the outer surface of the mounting object), method 700 moves from step 765 to step 770, where a determination is made that the latch is not engaged. If the visual flag does indicate that the end of the worm gear is flush with the outer surface of the mounting object, method 700 moves from step 765 to step 775, where a determination is made that the latch is engaged. This visual indication of the latched state allows operators to quickly determine whether the latch is fully engaged, which may prevent latching objects such as quick access panels on aircraft from departing from the mounting panel during flight. Method 700 then moves from steps 770 and 775 to step 780, where method 700 ends.

FIG. 8 illustrates an example method 800 for latching two objects. Method 800 begins at step 810. At step 820, a determination is made as to whether a visual flag (e.g., visual flag 450 of FIG. 4B) indicates that a latch (e.g., latch 100 of FIG. 1) is engaged such that a mounting object (e.g., mounting object 410 of FIG. 4A) is latched with a latching object (e.g., latching object 420 of FIG. 4A). The visual flag may indicate that the latch is engaged if an end of a worm gear (e.g., worm gear 110 of FIG. 1) of the latch is flush with an outer surface of the mounting object.

If the visual flag indicates that the latch is engaged, method 800 moves from step 820 to step 880, where method 800 ends. If the visual flag indicated that the latch is not engaged (e.g., the end of the worm gear is recessed from the outer surface of the mounting object), method 800 moves from step 820 to step 830, where the worm gear of the latch is rotated. The worm gear may be rotated with a tool such as a torqueing wrench. Method 800 then moves from step 830 to 840, where a spur gear (e.g., spur gear 120 of FIG. 1) of the latch automatically rotates in response to the rotation of the worm gear. A threaded shaft of the worm gear may engage with teeth of the spur gear such that the rotation of the threaded shaft of the worm gear causes the teeth of the spur gear to rotate. In certain embodiments, the gear ratio between the worm gear and the spur gear of the latch may be 20:1. The gear ratio between the worm gear and the spur gear may be 30:1 for relatively larger latches. Higher gear ratios provide higher load capacities. Method 800 then moves from step 840 to step 850.

At step 850, a lever arm (e.g., lever arm 130 of FIG. 1) of the latch automatically rotates in response to the rotation of the spur gear. For example, the spur gear may have a key that is inserted into an opening in the lever arm, causing the spur gear and the lever arm to move together. The rotation of the spur gear then causes the lever arm to pivot about an axis (e.g., a centerline of axle 140 of FIG. 1). As the lever arm pivots toward a latching object (e.g., latching object 420 of FIG. 4A) that overlaps the mounting object, a contact device (e.g., contact device 180 of FIG. 1) may eventually contact and exert force upon the latching object. Method 800 then moves from step 850 to step 860.

At step 860, method 800 determines whether an outer surface of a contact pad (e.g., contact pad 182 of FIG. 1) of the contact device is flush with an outer surface of the latching object. If the outer surface of the contact pad of the contact device is flush with the outer surface of the latching object, method 800 moves from step 860 back to step 820. If the outer surface of the contact pad of the contact device is not flush with the outer surface of the latching object, method 800 moves from step 860 to step 870, where the contact device rotates within the lever arm until the outer surface of the contact pad is flush with the outer surface of the latching object. The contact device self-aligns to accommodate different thicknesses of latching objects. Method 800 then moves from step 870 back to step 820.

At step 820, method 800 again determines whether the visual flag of the latch indicates that the latch is engaged. Once the visual flag indicates that the latch is engaged (i.e., the end of the worm gear of the latch is flush with the outer surface of the mounting panel), method 800 advances to step 880, where method 800 ends.

Modifications, additions, or omissions may be made to methods 700 and 800 depicted in FIGS. 7 and 8. Methods 700 and 800 may include more, fewer, or other steps. For example, method 700 may include one or more steps for determining a required load capacity to latch the latching object to the mounting object and sizing one or more components of the latch (e.g., the worm gear and the spur gear) based on the required load capacity. As another example, method 800 may include one or more steps for axially shifting the worm gear of the latch toward the mounting object in response to rotating the worm gear.

Steps of methods 700 and 800 depicted in FIGS. 7 and 8 may be performed in parallel or in any suitable order. For example, step 730 of method 700 for inserting the contact device into the lever arm of the latch may be performed prior to step 715 of inserting the key of the spur gear into the lever arm of the latch. While discussed as specific components completing the steps of methods 700 and 800, any suitable component may perform any step of method 700 and 800.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
   a first object;
   a second object; and
   a latch, the latch comprising:
     a worm gear;
     a spur gear operable to rotate in response to rotating the worm gear; and
     a lever arm operable to rotate in response to rotating the spur gear;
   wherein:
     the first object is operable to latch to the second object in response to rotating the lever arm;
     an end of the worm gear is recessed from an outer surface of the first object when the first object is not latched to the second object, thereby providing a visual indication that the first object is not latched to the second object; and
     the end of the worm gear is flush with the outer surface of the first object when the first object is latched to the second object, thereby providing a visual indication that the first object is latched to the second object.

2. The system of claim 1, further comprising a contact device, wherein:
   the contact device comprises a contact pad and a spherical ball;
   the spherical ball is located within an opening in the lever arm;
   the spherical ball is operable to rotate within the opening of the lever arm; and
   the contact pad is operable to contact a surface of the second object.

3. The system of claim 1, wherein the spur gear comprises a key that is inserted into the lever arm such that the spur gear and the lever arm move together.

4. The system of claim 1, further comprising:
   a housing that surrounds the worm gear and the spur gear;
   a retainer located around a first portion of the worm gear; and
   a wave spring located around a second portion of the worm gear;
   wherein:
     the wave spring is located between the retainer and a threaded shaft of the worm gear; and
     the wave spring is operable to expand and push the worm gear away from the first object and toward an inner surface of the housing.

5. The system of claim 4, further comprising a nut fastened to a portion of the worm gear, wherein:
   the nut is adjusted based on a thickness of the second object; and
   the nut contacts an exterior surface of the housing when the first object is latched to the second object.

6. The system of claim 1, wherein:
   the first object is a mounting panel; and
   the second object is an access panel.

7. The system of claim 1, wherein:
   the worm gear is restricted from rotational movement in response to rotation of the spur gear; and
   the worm gear is operable to move axially in response to the rotation of the spur gear.

8. An apparatus, comprising:
   a worm gear;
   a spur gear operable to rotate in response to rotating the worm gear; and
   a lever arm operable to rotate in response to rotating the spur gear;
   wherein:
     a mounting panel is operable to latch to an access panel in response to rotating the lever arm;
     an end of the worm gear is recessed from an outer surface of the mounting panel when the mounting panel is not latched to the access panel; and
     the end of the worm gear is flush with the outer surface of the mounting panel when the mounting panel is latched to the access panel.

9. The apparatus of claim 8, further comprising a contact device, wherein:
   the contact device comprises a contact pad and a spherical ball;
   the spherical ball is located within an opening in the lever arm;
   the spherical ball is operable to rotate within the opening of the lever arm; and
   the contact pad is operable to contact a surface of the second object.

10. The apparatus of claim 8, wherein the spur gear comprises a key that is inserted into the lever arm such that the spur gear and the lever arm move together.

11. The apparatus of claim 8, further comprising:
    a housing that surrounds the worm gear and the spur gear;
    a retainer located around a first portion of the worm gear; and
    a wave spring located around a second portion of the worm gear;
    wherein:
      the wave spring is located between the retainer and a threaded shaft of the worm gear; and
      the wave spring is operable to expand and push the worm gear away from the first object and toward an inner surface of the housing.

12. The apparatus of claim 11, further comprising a nut fastened to a portion of the worm gear, wherein:
    the nut is adjusted based on a thickness of the second object; and the nut contacts an exterior surface of the housing when the first object is latched to the second object.

13. The apparatus of claim 8, wherein:
the worm gear is restricted from rotational movement in response to rotation of the spur gear; and
the worm gear is operable to move axially in response to the rotation of the spur gear.

14. A method, comprising:
rotating a worm gear of a latch;
rotating a spur gear of the latch in response to rotating the worm gear;
rotating a lever arm of the latch in response to rotating the spur gear; and
latching a first object to a second object in response to rotating the lever arm;
wherein:
an end of the worm gear is recessed from an outer surface of the first object when the first object is not latched to the second object, thereby providing a visual indication that the first object is not latched to the second object; and
the end of the worm gear is flush with the outer surface of the first object when the first object is latched to the second object, thereby providing a visual indication that the first object is latched to the second object.

15. The method of claim 14, wherein:
the latch comprises a contact device;
the contact device comprises a contact pad and a spherical ball;
the spherical ball is located within an opening in the lever arm;
the spherical ball rotates within the opening of the lever arm; and
the contact pad contacts a surface of the second object.

16. The method of claim 14, wherein:
a housing surrounds the worm gear and the spur gear;
a retainer of the latch is located around a first portion of the worm gear; and
a wave spring of the latch is located around a second portion of the worm gear;
the wave spring is located between the retainer and a threaded shaft of the worm gear; and
the wave spring expands and pushes the worm gear away from the first object and toward an inner surface of the housing.

17. The method of claim 16, wherein:
a nut is fastened to a portion of the worm gear;
the nut is adjusted based on a thickness of the second object; and
the nut contacts an exterior surface of the housing when the first object is latched to the second object.

18. The method of claim 14, wherein:
the first object is a mounting panel; and
the second object is an access panel.

\* \* \* \* \*